United States Patent
Davydov et al.

(10) Patent No.: US 8,854,981 B2
(45) Date of Patent: Oct. 7, 2014

(54) SIGNAL INTERFERENCE MEASUREMENTS IN A WIRELESS COMMUNICATION NETWORK

(71) Applicant: Intel Corporation, Santa Clara, CA (US)

(72) Inventors: Alexei Davydov, Nizhny Novgorod (RU); Gregory Morozov, Nizhny Novgorod (RU); Ilya Bolotin, Nizhny Novgorod (RU); Alexander Maltsev, Nizhny Novgorod (RU); Vadim Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/681,315
(22) Filed: Nov. 19, 2012
(65) Prior Publication Data

US 2013/0286867 A1    Oct. 31, 2013

Related U.S. Application Data

(60) Provisional application No. 61/639,795, filed on Apr. 27, 2012.

(51) Int. Cl.

| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04W 24/08* | (2009.01) |
| *H04W 24/06* | (2009.01) |
| *H04W 52/02* | (2009.01) |
| *H04W 24/02* | (2009.01) |

(52) U.S. Cl.
CPC .......... *H04W 52/0206* (2013.01); *H04W 24/02* (2013.01); *H04W 24/08* (2013.01); *Y02B 60/50* (2013.01); *H04W 24/06* (2013.01)
USPC ............................ 370/241; 370/250; 370/252

(58) Field of Classification Search
None
See application file for complete search history.

(56) References Cited

U.S. PATENT DOCUMENTS

2010/0069063 A1*  3/2010  Osterling et al. ............. 455/434
2011/0085587 A1*  4/2011  Moulsley et al. ............. 375/219

(Continued)

FOREIGN PATENT DOCUMENTS

| KR | 10-2010-0005575 A | 1/2010 |
|---|---|---|
| KR | 10-2010-0062904 A | 6/2010 |
| KR | 10-2011-0012968 A | 2/2011 |
| KR | 10-2011-0136249 A | 12/2011 |
| WO | WO 2011-145886 A2 | 11/2011 |

OTHER PUBLICATIONS

International Search Report and Written Opinion mailed Aug. 18, 2013 from International Application No. PCT/US2013/038283.

(Continued)

*Primary Examiner* — Ayaz Sheikh
*Assistant Examiner* — Peter Chau
(74) *Attorney, Agent, or Firm* — Schwabe, Williamson & Wyatt, P.C.

(57) ABSTRACT

Embodiments of the present disclosure describe techniques and configurations for handling interference measurements in a wireless communication network. An apparatus may include computer-readable media having instructions and processors coupled with the computer-readable media and configured to execute the instructions to identify, for a serving eNB, a neighboring eNB for which signal interference measurements are to be performed by one or more wireless devices served by the serving eNB, and request that the neighboring eNB transmit typical interference signals within data units which are configured for, and may or may not have, a scheduled physical downlink shared channel transmission. The wireless devices may be configured to perform the signal interference measurements based at least in part on the typical interference signals, which may include non-zero-power signals or zero-power signals. Other embodiments may be described and claimed.

24 Claims, 6 Drawing Sheets

(56) References Cited

U.S. PATENT DOCUMENTS

| | | | |
|---|---|---|---|
| 2011/0103282 A1* | 5/2011 | Jeon et al. | 370/311 |
| 2011/0110254 A1* | 5/2011 | Ji et al. | 370/252 |
| 2011/0275361 A1* | 11/2011 | Yavuz et al. | 455/422.1 |
| 2012/0106374 A1* | 5/2012 | Gaal et al. | 370/252 |
| 2012/0315859 A1* | 12/2012 | Lee et al. | 455/67.13 |
| 2013/0114428 A1* | 5/2013 | Koivisto et al. | 370/252 |
| 2013/0196675 A1* | 8/2013 | Xiao et al. | 455/452.1 |

OTHER PUBLICATIONS

Casinovi, Giorgio, "Sampling and Ergodic Theorems for Weakly Almost Periodic Signals," IEEE Transactions on Information Theory, vol. 55, No. 4, Apr. 2009, pp. 1883-1897.

Guimaraes, Dayan Adionel, "Digital Transmission: A Simulation-Aided Introduction with VisSim/Comm" Springer 2009, Jan. 18, 2010, pp. 90.

* cited by examiner

SIGNAL INTERFERENCE MEASUREMENTS IN A WIRELESS COMMUNICATION NETWORK

CROSS REFERENCE TO RELATED APPLICATIONS

The present application claims priority to U.S. Provisional Patent Application No. 61/639,795, filed Apr. 27, 2012, entitled "Advanced Wireless Communication Systems and Techniques," which is hereby incorporated by reference in its entirety for all purposes.

FIELD

Embodiments of the present disclosure generally relate to the field of wireless communication systems, and more particularly, to techniques and configurations for handling interference measurements in wireless communication networks.

BACKGROUND

Wireless devices (also known as user equipment or UE) operating within wireless communication networks may communicate via intermediary devices, known as base stations or nodes, configured to handle such communications within a predetermined area, known as a cell. In some instances, a base station may interact with many UEs approximately at the same time, which may cause signal interference issues for at least some UEs that may be communicating with a different base station. Signal interference measurements reflecting signal interference may be performed by the UE and provided to the serving base station, for example in a form of Channel Quality Indicator (CQI) reports. These measurements are provided in order to ensure appropriate signal quality, acceptable rate of signal transmission, accurate modulation, and other parameters associated with transmissions from the serving base station to the UE (known as downlink transmissions). Based at least in part on signal interference measurements, different base stations may coordinate their transmissions to provide better signal quality for the users of the UEs reachable by these base stations.

However, because the interference sources, such as neighboring base stations, may not be active all the time (e.g., the neighboring base stations may not be transmitting or may be transmitting intermittently), the measured and reported interferences may not always accurately reflect the real interference situation. For example, a neighboring base station may be configured to transmit over a particular time period. However, in real life, the neighboring base station may not always be active during the time period of expected transmission. Assuming that UE may be performing interference averaging over some period of time that may include the time period of expected transmission during which the neighboring base station happened to be inactive, the reported CQI may not accurately reflect a typical interference picture for the neighboring base station.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure provide data techniques and configurations in a wireless communication network including techniques and configurations for handling interference measurements in a wireless communication network. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application-Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described herein in relation to wireless communication networks including networks such as $3^{rd}$ Generation Partnership Project (3GPP) Long-Term Evolution (LTE) networks including any amendments, updates, and/or revisions (e.g., LTE Release 10 (also referred to as LTE-Advanced (LTE-A), LTE Release 11, etc.), Worldwide Interoperability for Microwave Access (WiMAX) networks, and the like. The embodiments described herein may operate in relation to a radio access network, e.g., an evolved Universal Terrestrial Radio Access Network (E-UTRAN) having evolved node base stations (eNBs), and a core network, e.g., an evolved packet core having gateways, management entities, etc. The terms "base station" and "eNB" will be used interchangeable hereinafter.

In other embodiments, communication schemes described herein may be compatible with additional/alternative communication standards, specifications, and/or protocols.

For example, embodiments of the present disclosure may be applied to other types of wireless networks where similar advantages may be obtained. Such networks may include, but are not limited to, wireless local area networks (WLANs), wireless personal area networks (WPANs), and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes (eNBs), gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

Techniques described herein provide for handling interference measurements, such as ones that may occur when a UE communicates with a serving base station in a wireless network environment, wherein a neighboring base station may be also communicating with other UEs, which may cause signal interference issues for the UE communicating with the serving base station. In some instances, interference measurements may be averaged over a period of time, which may cause inaccuracies in measurements of instantaneous interference conditions. The techniques described herein provide for emulating interference from a neighboring base station by requesting the neighboring station to transmit a typical interference signal (e.g., non-zero power signal) during an expected (e.g., scheduled) transmission period in which the base station is not transmitting, in order to capture expected interference. In another example, the techniques provide for emulating non-interference from a neighboring base station by requesting the neighboring station not to transmit (e.g., transmit a zero-power signal) during an expected (e.g., scheduled) transmission in which the base station may or may not be transmitting in order to capture expected non-interference. Handling of the interference emulation in different situations is described below in greater detail. The UE that communicates with the serving base station may perform interference measurements for the neighboring base station and report back to the serving base station with interference measurement reports, such as, for example, Channel Quality Indicator (CQI) report.

Figure 1:
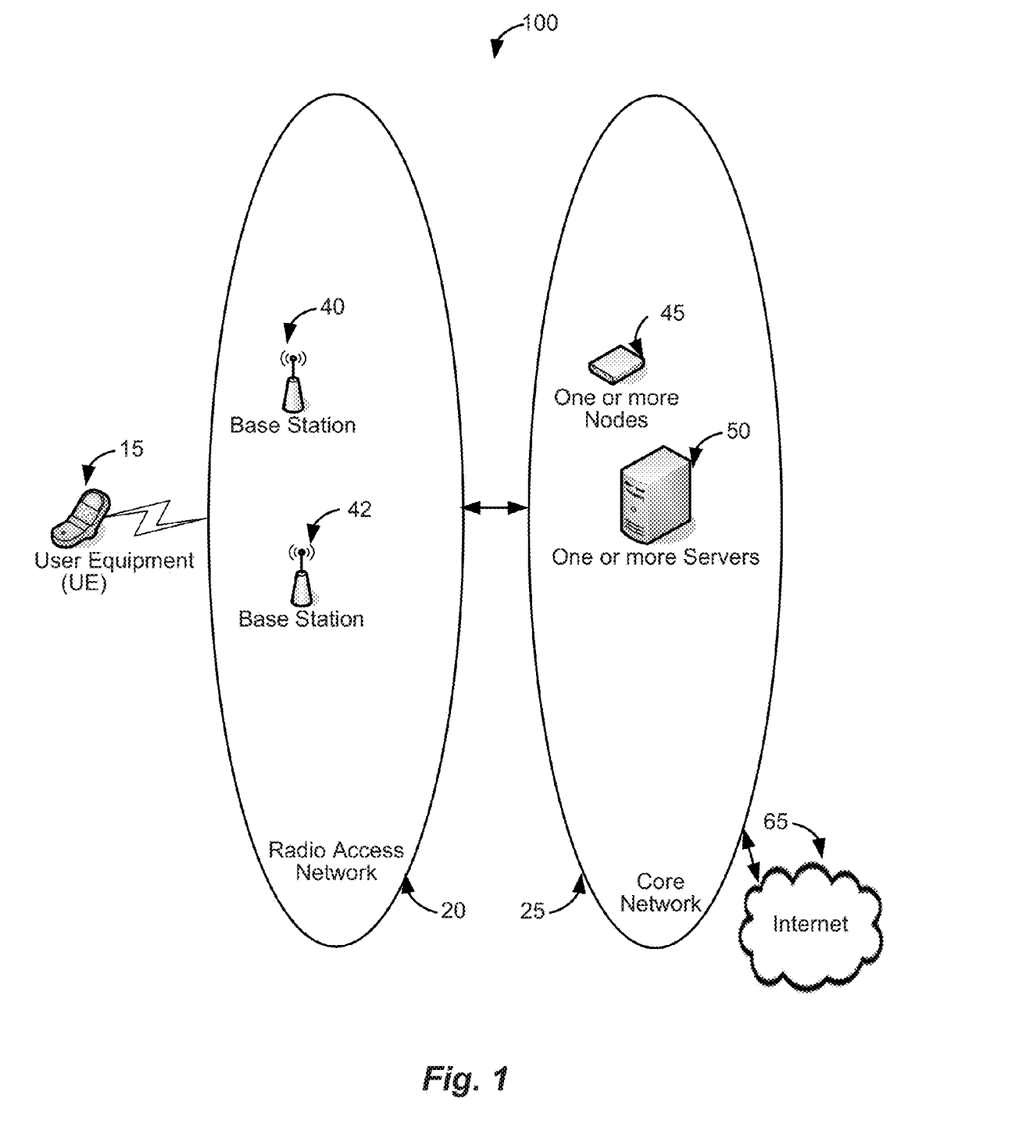
FIG. 1 illustrates an example wireless communication network in accordance with some embodiments.

FIG. 1 schematically illustrates an example wireless network 100 in accordance with some embodiments. The network 100 may include a RAN 20 and a core network 25. In some embodiments, the network 100 may be an LTE network, the RAN 20 may be E-UTRAN, and the core network 25 may be an evolved core network such as EPS (Evolved Packet System). A UE 15 may access the core network 25 via a radio link ("link") with an eNB such as, for example, one of eNBs 40, 42, etc., in the RAN 20. The UE 15 may be, for example, a subscriber station (e.g., a mobile wireless device) that is configured to communicate with the eNBs 40, 42 in conformance with one or more protocols. The following description is provided for an example network 100 that conforms with 3GPP for ease of discussion. However, subject matter of the present disclosure is not limited in this regard and the described embodiments may apply to other networks that benefit from the principles described herein.

In some embodiments, the UE 15 may be configured to communicate using a multiple-input and multiple-output (MIMO) communication scheme. One or more antennas of the UE 15 may be used to utilize radio resources to communicate in a wireless network that may comprise one or more base stations (e.g., eNBs 40, 42) of RAN 20. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments.

While FIG. 1 generally depicts the UE 15 as a mobile wireless device (e.g., a cellular phone), in various embodiments the UE 15 may be a personal computer (PC), a notebook, ultrabook, netbook, smartphone, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like. In the present disclosure, the terms UE and mobile (wireless) device will be used interchangeably for simplicity purposes. The eNBs 40, 42 may include one or more antennas, one or more radio modules to modulate and/or demodulate signals transmitted or received on an air interface, and one or more digital modules to process signals transmitted and received on the air interface.

In some embodiments, communication with the UE 15 via RAN 20 may be facilitated via one or more nodes 45 (e.g., Radio Network Controllers). The one or more nodes 45 may act as an interface between the core network 25 and the RAN 20. According to various embodiments, the one or more nodes 45 may include a Mobile Management Entity (MME) that is configured to manage signaling exchanges (e.g., authentication of the UE 15 and NAS (non-access stratum) messages) between the eNBs 40, 42 and the core network 25 (e.g., one or more servers 50), a Packet Data Network Gateway (PGW) to provide a gateway router to the Internet 65, and/or a Serving Gateway (SGW) to manage user data tunnels or paths between the eNBs 40, 42 of the RAN 20 and the PGW. Other types of nodes may be used in other embodiments.

The core network 25 may include logic (e.g., a module) to provide authentication of the UE 15 or other actions associated with establishment of a communication link to provide a connected state of the UE 15 with the network 100. For example, the core network 25 may include one or more servers 50 that may be communicatively coupled to the eNBs 40, 42. In an embodiment, the one or more servers 50 may include a Home Subscriber Server (HSS), which may be used to manage user parameters such as a user's International Mobile Subscriber Identity (IMSI), authentication information, and the like. The core network 25 may include other servers, interfaces, and modules. In some embodiments, logic associated with different functionalities of the one or more servers 50 may be combined to reduce a number of servers, including, for example, being combined in a single machine or module.

According to various embodiments, the network 100 may be an Internet Protocol (IP) based network. For example, the core network 25 may be, at least in part, an IP based network, such as a packet switched (PS) network. Interfaces between network nodes (e.g., the one or more nodes 45) may be based on IP, including a backhaul connection to the base stations 40, 42. In some embodiments, the network may be enabled to provide connection with a circuit switched (CS) network (e.g., CS domain). In an embodiment, a UE may communicate with the network according to one or more communication protocols, such as, for example, Radio Resource Control (RRC) protocol adapted for LTE communication environment.

For purposes of this disclosure, the communications described herein may occur within the RAN 20 between eNBs 40 and/or 42 and one or more user equipment 15. In some embodiments, the communications may occur in a Coordinated Multipoint Transmission (CoMP) environment providing for coordinating transmission signals from multiple eNBs, such as 40, 42, in order to increase data transmission rates. In some embodiments, the communications may occur in Enhanced Inter-Cell interference Coordination (eICIC) environment introduced, e.g., in LTE Rel-10 and directed to keeping the inter-cell interferences under control by radio resource management (RRM) methods. For example, in the CoMP environment, the eNB 40 may be a serving base station for one or more UEs (e.g., UE 15) and the eNB 42 may be a transmission point (e.g., remote radio head (RRH), picocell, and the like).

In some embodiments, communications from the eNBs 40, 42 to UE 15 (known as downlink transmissions) may occur via physical downlink shared channel (PDSCH) that may be used, for example, to send user data and control information to one or more mobile devices operating within the eNBs' coverage area. In some embodiments, PDSCH transmissions from the base stations (e.g., serving eNB 40 and neighboring eNB 42) may be scheduled. In some embodiments, the UE 15 may be configured to communicate with the serving eNB 40, while the eNB 42 may be a neighboring base station communicating with other UEs (not shown). Accordingly, the UE 15 may perform interference measurements for the neighboring eNB 42 and communicated interference measurement information to the serving eNB 40.

Figure 2:
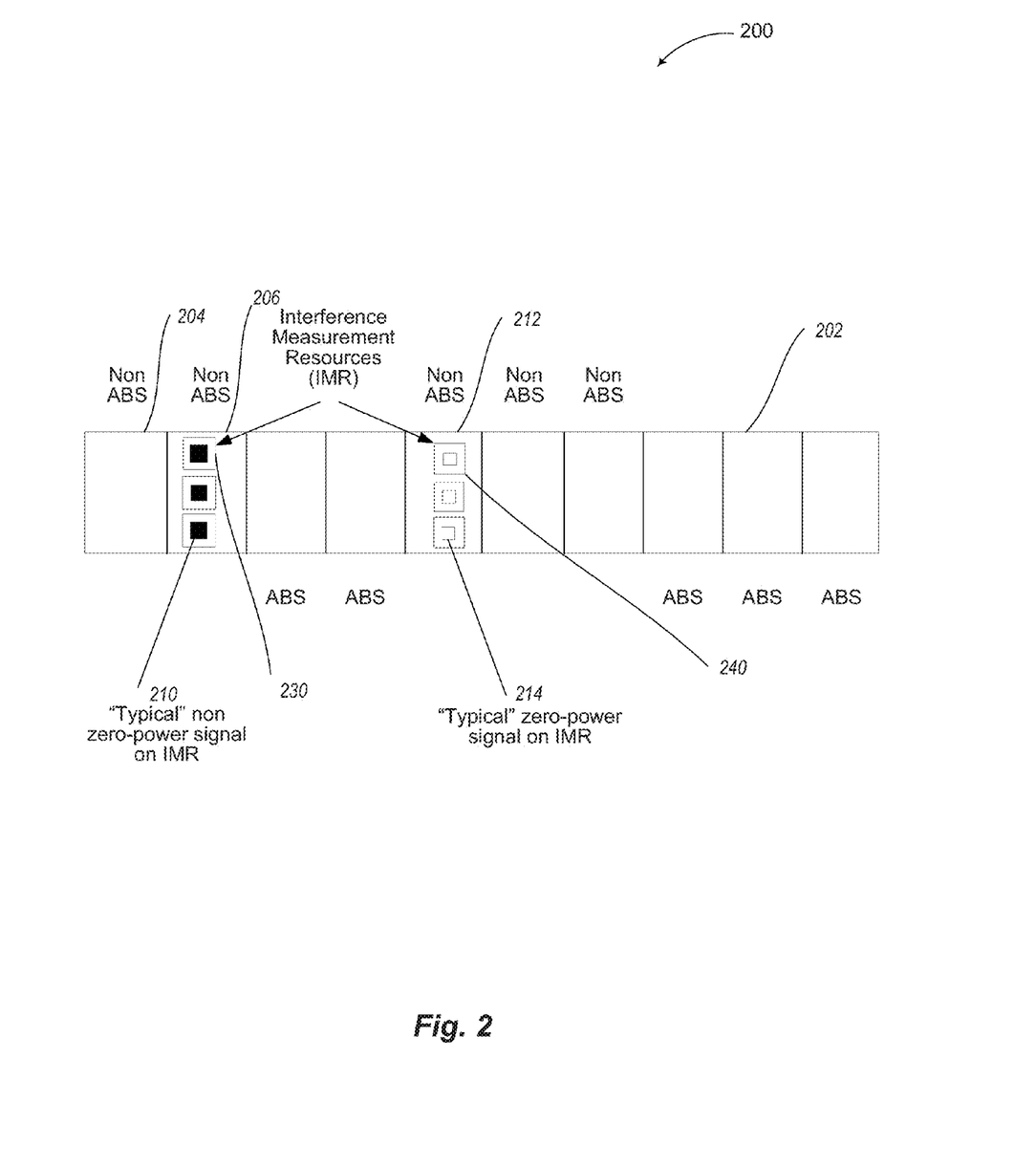
FIG. 2 is a diagram illustrating a neighboring base station's downlink signal transmission including a typical interference signal used for signal interference measurements for the neighboring base station in accordance with some embodiments.

FIG. 2 illustrates an example diagram 200 for a data transmission from the neighboring eNB (e.g., 42) to the UE 15 that emulates signal interference by the eNB 42 in communications between the UE 15 and the eNB 40. Signal interference may be emulated by including in the data transmission from the interfering neighboring eNB 42 a typical interference signal as described below in greater detail. As the diagram 200 illustrates, a transmission may include different data units, such as almost blank subframes (ABS) 202 and non-almost blank subframes (non-ABS) 204. For an eNB (such as eNB 42) ABS subframes may be defined as subframes where the eNB operates at reduced downlink transmission power and/or activity. For ABS subframes, signal interference may be measured in a regular way and is not a subject of the present disclosure. Non-ABS subframes may be data units where the eNB operates at a regular downlink transmission power and/or activity. Interference emulation for non-ABS subframes is described below in greater detail.

Data units may include data portions that carry reference signal information, such as channel state information reference signal (CSI-RS) or common reference signal (CRS) as a part of a regular (e.g., physical downlink shared channel) transmission. These data units may comprise basic units of a subframe, known as resource elements (REs). In some embodiments resource elements may be assigned to UE in proportion to the data rate experienced by the UE. In some embodiments, some of the REs that are assigned to reference signal information on which UE may perform interference measurements may be included in Interference Measurement Resources (IMR) 230 and 240. In other words, Interference Management Resources 230 and 240 may be configured to include a typical reference signal (e.g., 210 or 214 respectively provided in the respective REs) as shown in FIG. 2.

In some embodiments the neighboring eNB (e.g. eNB 42) may be configured to transmit a typical signal on one or more IMR. A typical signal may reflect an interference environment hypothesis for which CQI report is required. For various purposes of coordination of service of different UE it is useful to know interference environment in two instances. For example, to include a neighboring base station in a coordination set it is useful to assess interference environment, from that station, specifically, when the station is transmitting or when the station is not transmitting. A first interference environment hypothesis may suppose that a neighboring base station (e.g., eNB 42) is transmitting. A second hypothesis may suppose that the neighboring base station (e.g., eNB 42) is not transmitting. However, due to lack of coordination in scheduling or independent scheduling decisions, one base station may not always know what another is doing at any particular time, i.e., which interference reality exists at a given time. Accordingly, to test the first interference environment hypothesis, interference from a neighboring base station may be measured at the UE. Specifically, interference from a neighboring base station may be measured when the neighboring base station may be expected (e.g., scheduled) to have a PDSCH transmission but in fact may not be transmitting (e.g., at a determined power level) and may be requested to emulate transmission. In another example, testing the second interference environment hypothesis may include measuring, at the UE, non-interference from a neighboring base station, e.g., a situation when the neighboring base station may or may not be transmitting PDSCH but may be requested to emulate non-transmission for non-interference measurement purposes. Accordingly, for the above examples, a serving base station or a network server may request that the neighboring base station include in the transmission a particular (first or second) reference signal depending on the interference environment hypothesis.

Accordingly, in some embodiments, a first typical interference signal 210 included by a neighboring base station, upon request from a serving base station or network server, in the IMR 230 in non-ABS 206, may reflect the first interference environment hypothesis and correspond to RS having a non-zero-power CSI-RS or CRS. A first typical signal (i.e., a signal emulating a typical non-zero-power PDSCH transmission by the neighboring station) may correspond to pseudo-random modulation sequence with typical number of spatial layers, beamforming weights, and power settings used by the neighboring eNB 42 during active state (e.g., during scheduled PDSCH transmissions) in the past.

The first typical interference signal may be included in the non-ABS 206 of the downlink transmission 200 when the neighboring eNB 42 may be supposed (e.g., scheduled) to transmit PDSCH (illustrated by non-ABS subframe 206) but in fact may not be transmitting (e.g., at an expected power level) during a period of time allocated for interference measurement. To summarize, the first typical interference signal may emulate a transmission that would have occurred had the eNB 42 been transmitting in a regular, expected or scheduled manner (e.g., at an expected power level).

In some embodiments, a second typical interference signal 214 included, for example, in the IMR 240 in non-ABS 212 may reflect the second interference environment hypothesis and correspond to a zero-power signal. More specifically, for non-interference measurements related to a particular neighboring base station, a zero-power (second) typical interference signal included, upon request from a serving base station or network server, in the IMR of a PDSCH transmission may emulate non-interference of the neighboring base station regardless of the actual transmission state of the neighboring base station (e.g., active or inactive).

To summarize, the second typical interference signal, e.g., a zero-power signal 214 corresponding to REs having non-zero-power signal may be included in the non-ABS 212 of the downlink transmission 200 when the neighboring eNB 42 may or may not be transmitting PDSCH (e.g., illustrated by non-ABS subframe 214) at an expected level, and UE may be expected (scheduled) to measure non-interference for the neighboring eNB. In this case, the neighboring eNB may be requested not to transmit PDSCH, or, rather, transmit a zero-power signal in the IMR in order to emulate non-interference.

Figure 3:
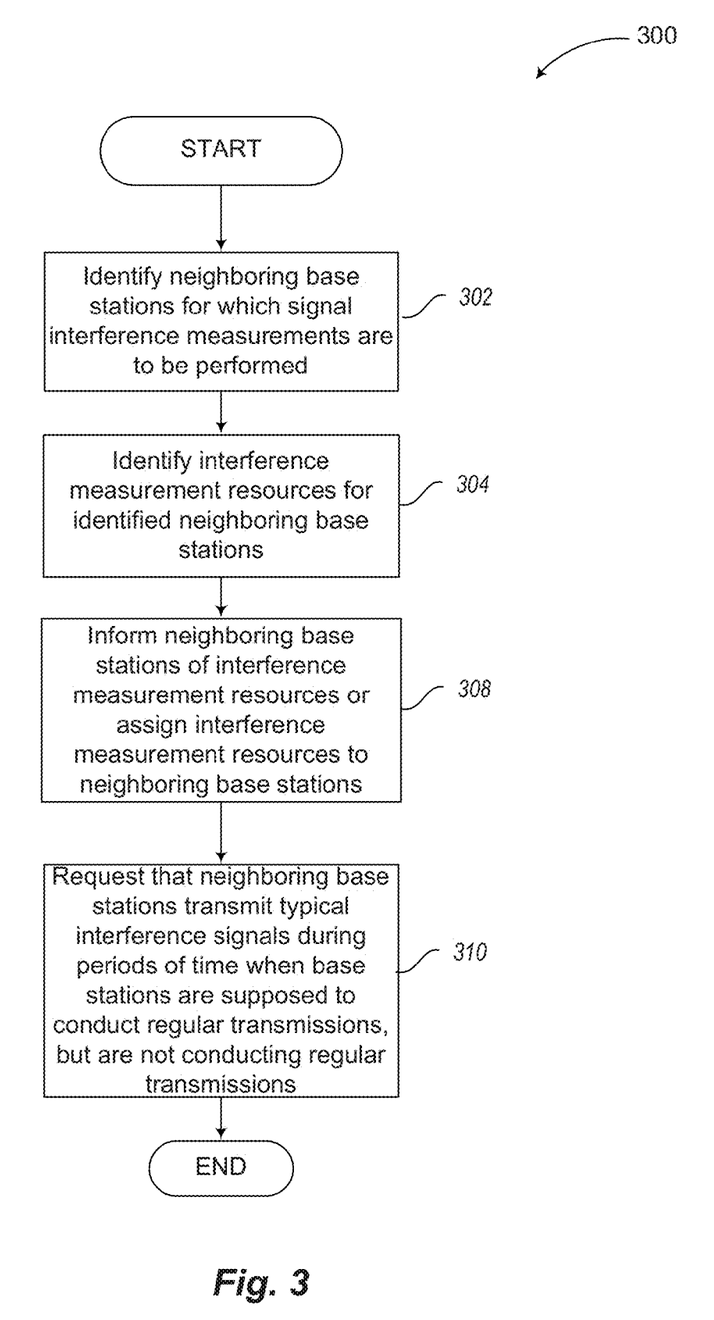
FIG. 3 is a process flow diagram illustrating interference measurement process in a wireless communication network in accordance with some embodiments.

FIG. 3 is a process flow diagram illustrating interference measurement process in a wireless communication network in accordance with some embodiments. The process 300 may be performed by a network server (e.g., server 50 in FIG. 1) or a serving base station (e.g., eNB 40 in FIG. 1). The process 300 illustrates an example first interference environment hypothesis described in reference to FIG. 2. More specifically, the process 300 illustrates an example when the neighboring base station may be expected (e.g., scheduled) to transmit PDSCH but in fact may not be transmitting (e.g., at a determined power level) and may be requested to emulate a typical transmission by including a first typical interference signal (e.g., non-zero-power signal) in the transmission.

The process 300 begins at block 302, where the network server or the serving base station may identify one or more neighboring base stations for which signal interference measurements are to be performed. The neighboring base stations may be identified based on various criteria. For example, in the CoMP or eICIC environment, the network server or the serving base station may determine that the quality of signals (e.g., determined data transmission rate level) may be affected by interferences from transmissions occurring from particular neighboring base stations. In another example, the network server or the serving base station may determine to switch off transmission in certain data frames in order to reduce interference on the UEs in neighboring cells. Generally, the decision to perform signal interference measurements may be based in part on optimizing channel transmissions, link adaptation, coding scheme selections, and other instances of optimizing network performance.

When the neighboring base stations are identified for which signal interference measurements are to be performed, the network server or serving base station, at block 304, may identify interference measurement resources (IMR) for the identified base stations. For example, specific resource elements (RE) may be identified on which interference measurements may be conducted. At block 308, the network server or serving base station may assign the identified IMR for the serving base station or the UE and/or inform neighboring base stations of the assigned IMR so that the neighboring base stations know where to transmit typical signals. In another example, the IMR may be configured for one or more neighboring base stations individually. In yet another example, the IMR may be configured for each identified neighboring base station manually, e.g., by an operator of the wireless communication network on which the interference measurements are to be performed. Other options for configuring IMR for identified neighboring base stations may be implemented.

At block 310, the network server or serving base station may request that identified base stations transmit first typical interference signals during periods of time when the base stations are supposed to conduct regular transmissions (e.g., periods of time corresponding to non-ABS frames) but are not in fact conducting regular transmissions. As described above in reference to FIG. 2, a first typical interference signal may be created based at least in part on various parameters of a typical transmission of a particular neighboring base station (e.g., power level, beam forming patterns, and the like) that may be gathered over a determined period of time. In one example, the first typical interference signal may be produced at the neighboring base station. In the other example, the first typical interference signal for a neighboring base station may be produced at a network server or serving base station and provided to the respective neighboring base station.

Figure 4:
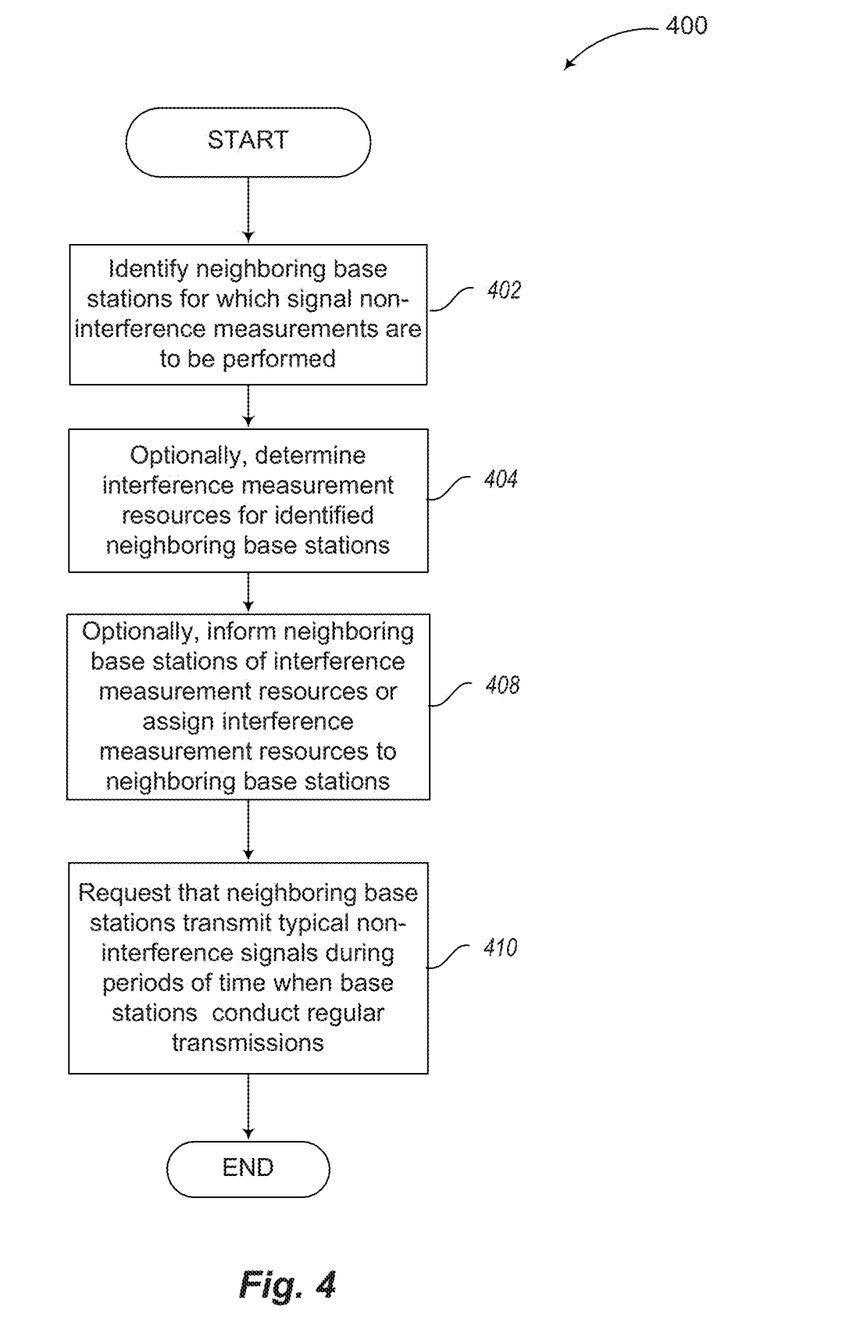
FIG. 4 is a process flow diagram illustrating some details of the interference measurement process in a wireless communication network in accordance with some embodiments.

FIG. 4 is a process flow diagram illustrating some details of the interference measurement process in a wireless communication network in accordance with some embodiments. More specifically, the process 400 illustrates an example second interference environment hypothesis when the neighboring base station may or may not be transmitting PDSCH but may be requested to emulate non-transmission for interference measurement purposes by including in the transmission a second typical interference signal (e.g., zero-power signal).

The process 400 begins at block 402, where the network server or the serving base station may identify one or more neighboring base stations for which signal non-interference measurements are to be performed. The non-interference measurements may be decided to be performed as part of network performance optimization described above in reference to FIG. 3.

At block 404, the network server or serving base station may optionally identify interference measurement resources (IMR) for the identified base stations. At block 408, the network server or serving base station may optionally assign the identified IMR for the serving base station or the UE and/or inform neighboring base stations of the assigned IMR so that the neighboring base stations know where to transmit typical signals. The operations described by blocks 404 and 408 may be optional as these operations may have already been performed in the course of the process 300 described in reference to FIG. 3.

At block 410, the network server or serving base station may request that identified base stations transmit second typical interference signals (e.g., zero-power signals) during periods of time when the base stations are supposed to conduct regular transmissions (e.g., periods of time corresponding to non-ABS frames).

Figure 5:
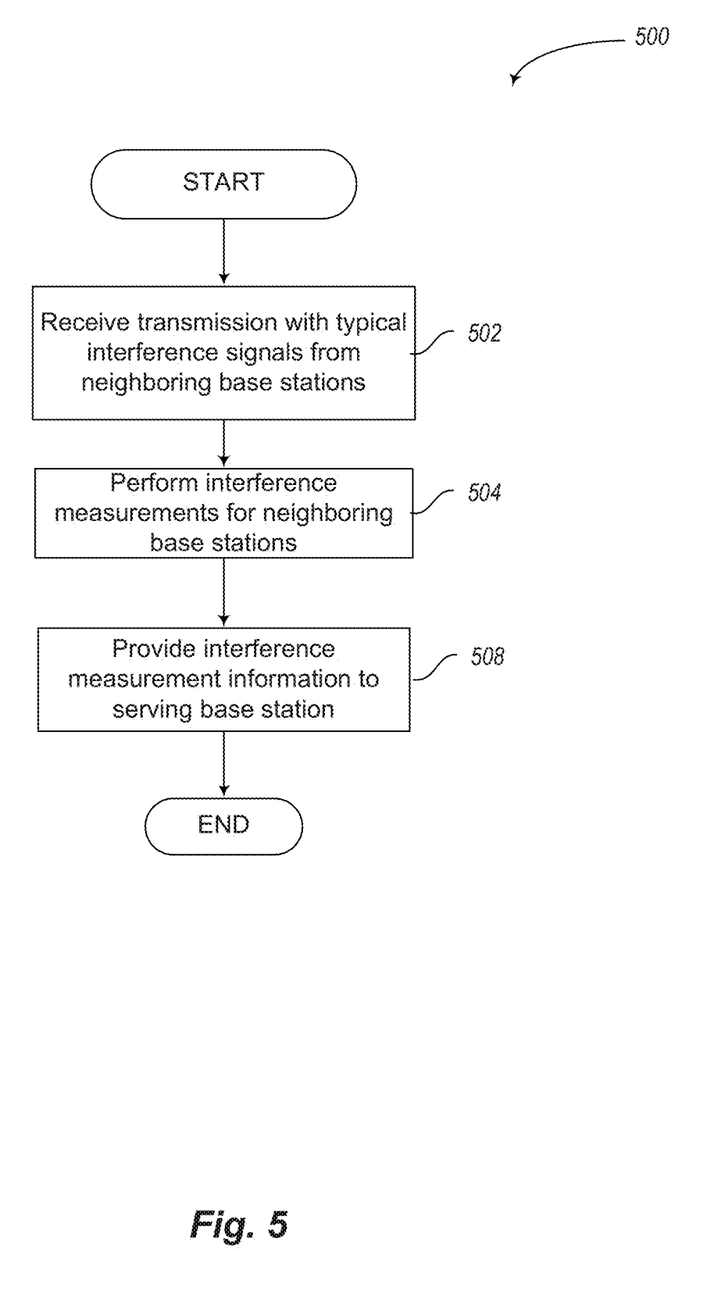
FIG. 5 is a process flow diagram illustrating interference measurements performed by user equipment in accordance with some embodiments.

FIG. 5 is a process flow diagram illustrating interference measurements performed by UE in accordance with some embodiments. The process 500 begins at block 502, where a UE may receive a transmission with typical interference signals from a neighboring base station. The transmission may be generated as described above in reference to FIGS. 2-4. At block 504, the UE may perform interference measurements based at least in part on the typical interference signals included in the transmission. As described above, the UE may perform interference measurements for a given interference hypothesis as a result of PDSCH interference emulation initiated at a network server or serving base station and carried out by the neighboring base station.

At block 508, the UE may provide the results of the interference measurements to the network server and/or serving base station. For example, the results may be provided in a form of channel quality indicator (CQI) report.

Figure 6:
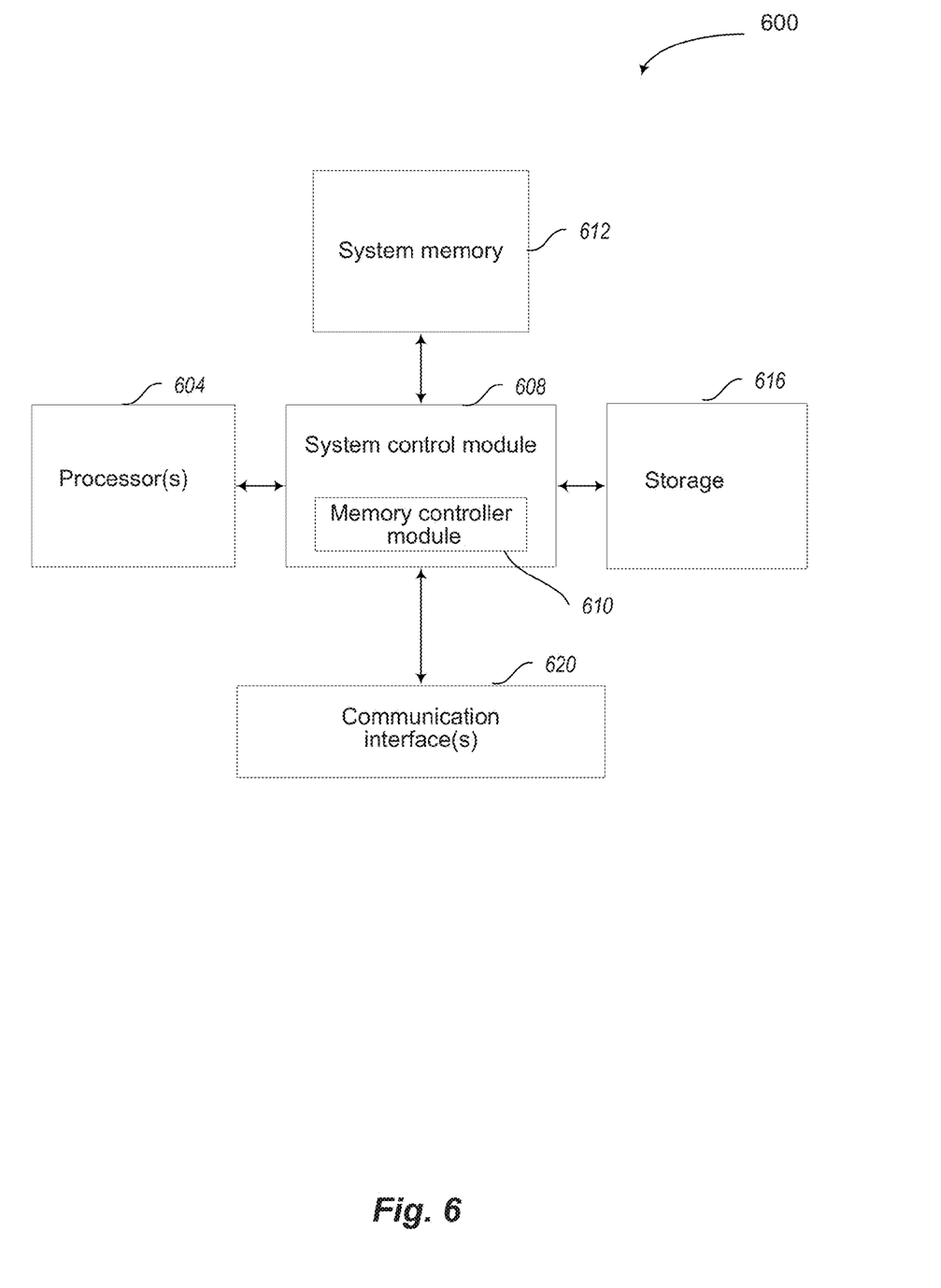
FIG. 6 illustrates an example system that may be used to practice various embodiments described herein.

Embodiments of the present disclosure may be implemented into a system using any suitable hardware and/or software to configure as desired. FIG. 6 schematically illustrates an example system that may be used to practice various embodiments described herein. FIG. 6 illustrates, for one embodiment, an example system 600 having one or more processor(s) 604, system control module 608 coupled to at least one of the processor(s) 604, system memory 612 coupled to system control module 608, non-volatile memory (NVM)/storage 616 coupled to system control module 608, and one or more communications interface(s) 620 coupled to system control module 608.

In some embodiments, the system 600 may be capable of functioning as the UE 15 as described herein. In other embodiments, the system 600 may be capable of functioning as the one or more nodes 45 or one or more servers 50 of FIG. 1 or otherwise provide logic/module that performs functions as described for eNB 40, 42 and/or other modules described herein. In some embodiments, the system 600 may include one or more computer-readable media (e.g., system memory or NVM/storage 616) having instructions and one or more processors (e.g., processor(s) 604) coupled with the one or more computer-readable media and configured to execute the instructions to implement a module to perform actions described herein. More specifically, in some embodiments, the system 600 may be configured to execute the instructions to perform operations illustrated in FIGS. 3-5 and described above.

System control module 608 for one embodiment may include any suitable interface controllers to provide for any suitable interface to at least one of the processor(s) 604 and/or to any suitable device or component in communication with system control module 608.

System control module 608 may include memory controller module 610 to provide an interface to system memory 612. The memory controller module 610 may be a hardware module, a software module, and/or a firmware module.

System memory 612 may be used to load and store data and/or instructions, for example, for system 600. System memory 612 for one embodiment may include any suitable volatile memory, such as suitable DRAM, for example. In some embodiments, the system memory 612 may include double data rate type four synchronous dynamic random-access memory (DDR4 SDRAM).

System control module 608 for one embodiment may include one or more input/output (I/O) controller(s) to provide an interface to NVM/storage 616 and communications interface(s) 620.

The NVM/storage 616 may be used to store data and/or instructions, for example. NVM/storage 616 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 616 may include a storage resource physically part of a device on which the system 600 is installed or it may be accessible by, but not necessarily a part of, the device. For example, the NVM/storage 616 may be accessed over a network via the communications interface(s) 620.

Communications interface(s) 620 may provide an interface for system 600 to communicate over one or more network(s) and/or with any other suitable device. The system 600 may wirelessly communicate with the one or more components of the wireless network in accordance with any of one or more wireless network standards and/or protocols.

For one embodiment, at least one of the processor(s) 604 may be packaged together with logic for one or more controller(s) of system control module 608, e.g., memory controller module 610. For one embodiment, at least one of the processor(s) 604 may be packaged together with logic for one or more controllers of system control module 608 to form a System in Package (SiP). For one embodiment, at least one of the processor(s) 604 may be integrated on the same die with logic for one or more controller(s) of system control module 608. For one embodiment, at least one of the processor(s) 604 may be integrated on the same die with logic for one or more controller(s) of system control module 608 to form a System on Chip (SoC).

In various embodiments, the system 600 may be, but is not limited to, a server, a workstation, a desktop computing device, or a mobile computing device (e.g., a laptop computing device, a handheld computing device, a tablet, a netbook, a mobile wireless device, etc.). In various embodiments, the system 600 may have more or less components, and/or different architectures. For example, in some embodiments, the system 600 may include one or more of a camera, a keyboard, liquid crystal display (LCD) screen (including touch screen displays), non-volatile memory port, multiple antennas, graphics chip, application-specific integrated circuit (ASIC), and speakers.

Embodiments of apparatus, packages, computer-implemented methods, systems, devices, and computer-readable media (transitory and non-transitory) are described herein for techniques for signal interference measurements. In some embodiments, the apparatus for signal interference measurements may be configured to identify, for a serving enhanced nodeB (eNB) in a wireless communication network, a neighboring eNB on which signal interference measurements are to be performed by one or more wireless devices served by the serving eNB, and request that the neighboring eNB emulate interference by transmitting one or more typical interference signals within one or more data units configured for a scheduled physical downlink shared channel (PDSCH) transmission.

The one or more wireless devices may be configured to perform the signal interference measurements based at least in part on the typical interference signals. The typical interference signals may include one or more first typical interference signals each of which includes a non-zero-power signal, and the data units may include one or more first data units in which the scheduled PDSCH transmission is determined not to occur. The apparatus may be further configured to cause each of the wireless devices to perform the signal interference measurements based at least in part on the transmitted one or more first typical interference signals and to provide a channel quality indicator (CQI) report based at least in part on the performed signal interference measurements.

The apparatus may be further configured to determine interference measurement resources for the neighboring eNB, where the interference measurement resources to be included in the data units, and assign the determined interference measurement resources to the neighboring eNB or inform the neighboring eNB of the determined interference measurement resources. The interference measurement resources may include one or more resource elements (RE) on which the signal interference measurements are performed.

The emulating interference may include emulating non-interference, where the one or more typical interference signals may include one or more second typical interference signals each of which includes a zero-power signal, and wherein the data units may include one or more second data units configured for the scheduled PDSCH transmission. The scheduled PDSCH transmission may or may not occur in the one or more second data units. The apparatus may be configured to cause the one or more wireless devices to perform the signal interference measurements based at least in part on the transmitted one or more second typical interference signals.

The apparatus, the serving eNB, the wireless devices, and the neighboring eNB may operate in at least one of Coordinated Multipoint Transmission (CoMP) environment associated with the wireless communication network or Enhanced Inter-Cell Interference Coordination (eICIC) environment associated with the wireless communication network, and the wireless communication network may include a $3^{rd}$ Generation Partnership Project (3GPP) Long Term Evolution (LTE) network. The signal interference measurements may be provided for the PDSCH associated with the wireless communication network, where the wireless communication network may include a 3GPP LTE network.

In some embodiments, an apparatus for signal interference measurements may comprise circuitry configured to obtain a request from a serving eNB that is configured to serve one or more wireless devices and transmit, based on the request, one or more typical interference signals within one or more data units configured for a scheduled physical downlink shared channel (PDSCH) transmissions. Each of the wireless devices may be configured to perform signal interference measurements based at least in part on the one or more typical interference signals. The request may be associated with emulating non-interference by the apparatus. The typical interference signals may include zero-power signals, and the data units may include second data units configured for the scheduled PDSCH transmission. The scheduled PDSCH transmission may or may not occur in the one or more second data units.

The request may be associated with emulating interference by the apparatus, where the typical interference signals may include non-zero-power signals, and the data units may include first data units in which the scheduled PDSCH transmission is determined not to occur. The typical interference signals may be produced based on a pseudo-random modulation sequence, and may be further configured based on one or more determined settings. The settings may include at least one of a number of spatial layers, beamforming weight, and power characteristics, and reflect an interference environment hypothesis for which signal interference measurements may be performed.

In some embodiments, a computer-implemented method for signal interference measurements may comprise determining, with a computing device, to perform signal interference measurements associated with a neighboring eNB, the signal interference measurements to be performed by one or more wireless devices served by a serving eNB associated with the neighboring eNB; and requesting, with the computing device, that the neighboring eNB transmit one or more typical interference signals within one or more data units configured for a scheduled downlink transmission. The wireless devices may be configured to perform the signal interference measurements based at least in part on the typical interference signals. The computing device may be associated with the serving eNB. The typical interference signals may include a non-zero-power signal and the scheduled downlink transmission may not occur within the data units. The non-zero power signal may include a power level used by the neighboring eNB to have the scheduled downlink transmission. In some embodiments, the typical interference signals may include a zero-power signal and the scheduled downlink transmission may or may not occur within the data units.

In some embodiments, a computing device-readable storage medium may comprise instructions for measuring signal interference stored thereon that, in response to execution on a computing device, may cause the computing device to determine, for one or more wireless devices served by a serving enhanced nodeB (eNB), to perform signal interference measurements, and request that the neighboring eNB transmit one or more typical interference signals within one or more data units configured for a scheduled downlink transmission, wherein the signal interference measurements are based at least in part on the one or more typical interference signals. The serving eNB may have a neighboring eNB and operate in a wireless communication network. The data units may correspond to non-almost blank subframes (non-ABS). The neighboring eNB may be configured to transmit the one or more first typical reference signals in non-ABS. The wireless communication network may include a 3GPP LTE network.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof

What is claimed is:

1. An apparatus comprising:
    one or more computer-readable media comprising instructions; and
    one or more processors coupled with the one or more computer-readable media and configured to execute the instructions to:
    identify, for a serving enhanced nodeB (eNB) in a wireless communication network, a neighboring eNB on which signal interference measurements are to be performed by one or more wireless devices served by the serving eNB, wherein to identify is based in part on a determination whether a quality of signals transmitted by the serving eNB is affected by interference from transmissions from the neighboring eNB; and
    request that the neighboring eNB emulate interference by transmitting one or more typical interference signals within one or more data units configured for a scheduled physical downlink shared channel (PDSCH) transmission, wherein the one or more data units are non-almost blank subframes (non-ABS), wherein the one or more typical interference signals are generated based in part on one or more parameters of transmissions by the neighboring eNB gathered over a determined period of time, the one or more parameters including at least a power level of transmissions and beam forming patterns gathered over the determined period of time,
    wherein the one or more wireless devices are configured to perform the signal interference measurements based at least in part on the one or more typical interference signals.

2. The apparatus of claim 1, wherein the one or more typical interference signals include one or more first typical interference signals each of which includes a non-zero-power signal, and wherein the one or more data units include one or more first data units in which the scheduled PDSCH transmission is determined not to occur.

3. The apparatus of claim 2, wherein the one or more processors are further configured to execute the instructions to cause each of the one or more wireless devices to perform the signal interference measurements based at least in part on the transmitted one or more first typical interference signals.

4. The apparatus of claim 3, wherein the one or more processors are configured to execute the instructions to cause each of the one or more wireless devices to provide a channel quality indicator (CQI) report based at least in part on the performed signal interference measurements.

5. The apparatus of claim 1, wherein the one or more processors are further configured to execute the instructions to:
   determine interference measurement resources for the neighboring eNB, the interference measurement resources to be included in the one or more data units; and
   assign the determined interference measurement resources to the neighboring eNB or inform the neighboring eNB of the determined interference measurement resources.

6. The apparatus of claim 5, wherein the interference measurement resources include one or more resource elements (RE) on which the signal interference measurements are performed.

7. The apparatus of claim 1, wherein the emulating interference includes emulating non-interference, wherein the one or more typical interference signals include one or more second typical interference signals each of which includes a zero-power signal, and wherein the one or more data units include one or more second data units configured for the scheduled PDSCH transmission.

8. The apparatus of claim 7, wherein the scheduled PDSCH transmission does or does not occur in the one or more second data units.

9. The apparatus of claim 8, wherein the one or more processors are further configured to execute the instructions to cause the one or more wireless devices to perform the signal interference measurements based at least in part on the transmitted one or more second typical interference signals.

10. The apparatus of claim 1, wherein the apparatus, the serving eNB, the one or more wireless devices, and the neighboring eNB operate in at least one of Coordinated Multipoint Transmission (CoMP) environment associated with the wireless communication network or Enhanced Inter-Cell Interference Coordination (eICIC) environment associated with the wireless communication network, and wherein the wireless communication network includes a $3^{rd}$ Generation Partnership Project (3GPP) Long Term Evolution (LTE) network.

11. The apparatus of claim 1, wherein the signal interference measurements are provided for the PDSCH associated with the wireless communication network, and wherein the wireless communication network includes a $3^{rd}$ Generation Partnership Project (3GPP) Long Term Evolution (LTE) network.

12. An apparatus comprising circuitry configured to:
   obtain a request from a serving enhanced nodeB (eNB) that is configured to serve one or more wireless devices, wherein the request is based on an identification by the serving eNB of a neighboring eNB on which signal interference measurements are to be performed by the one or more wireless devices served by the serving eNB and wherein the identification is based in part on a determination whether a quality of signals transmitted by the serving eNB is affected by interference from transmissions from the neighboring eNB; and
   transmit, based on the request, one or more typical interference signals within one or more data units configured for a scheduled physical downlink shared channel (PDSCH) transmission , wherein the one or more data units are non-almost blank subframes (non-ABS), wherein the one or more typical interference signals are generated based in part on one or more parameters of transmissions by the apparatus gathered over a determined period of time, the one or more parameters including at least a power level of transmissions and beam forming patterns gathered over the determined period of time, wherein each of the one or more wireless devices is configured to perform the signal interference measurements based at least in part on the one or more typical interference signals.

13. The apparatus of claim 12, wherein the request is associated with emulating non-interference by the apparatus, wherein the one or more typical interference signals include zero-power signals, and wherein the one or more data units include one or more second data units configured for the scheduled PDSCH transmission.

14. The apparatus of claim 13, wherein the scheduled PDSCH transmission does or does not occur in the one or more second data units.

15. The apparatus of claim 12, wherein the request is associated with emulating interference by the apparatus, wherein the one or more typical interference signals include non-zero-power signals, and wherein the one or more data units include one or more first data units in which the scheduled PDSCH transmission is determined not to occur.

16. The apparatus of claim 15, wherein the one or more typical interference signals are produced based on a pseudo-random modulation sequence, and are further configured based on one or more determined settings.

17. The apparatus of claim 16, wherein the one or more determined settings include at least one of a number of spatial layers, beamforming weight, and power characteristics, the one or more determined settings reflecting an interference environment hypothesis for which signal interference measurements are performed.

18. A computer-implemented method comprising:
   determining, with a computing device, to perform signal interference measurements associated with a neighboring enhanced nodeB (eNB), the signal interference measurements to be performed by one or more wireless devices served by a serving eNB associated with the neighboring eNB, wherein the determining is based on an identification by the serving eNB of the neighboring eNB on which the signal interference measurements are to be performed by the one or more wireless devices and wherein the identification is based in part on a determination whether a quality of signals transmitted by the serving eNB is affected by interference from transmissions from the neighboring eNB; and
   requesting, with the computing device, that the neighboring eNB transmit one or more typical interference signals within one or more data units configured for a scheduled physical downlink shared channel (PDSCH) transmission , wherein the one or more data units are non-almost blank subframes (non-ABS), wherein the one or more typical interference signals are generated based in part on one or more parameters of transmissions by the neighboring eNB gathered over a determined period of time, the one or more parameters including at least a power level of transmissions and beam forming patterns gathered over the determined period of time, wherein the one or more wireless devices are configured to perform the signal interference measurements based at least in part on the one or more typical interference signals.

19. The computer-implemented method of claim 18, wherein the computing device is the serving eNB.

20. The computer-implemented method of claim 18, wherein the one or more typical interference signals include a non-zero-power signal and wherein the scheduled downlink transmission does not occur within the one or more data units.

21. The computer-implemented method of claim 20, wherein the non-zero power signal includes a power level used by the neighboring eNB to have the scheduled downlink transmission.

22. The computer-implemented method of claim 20, wherein the one or more typical interference signals include a zero-power signal and wherein the scheduled downlink transmission does or does not occur within the one or more data units.

23. At least one non-transitory computing device-readable storage medium comprising instructions stored thereon wherein the instructions, in response to execution on a computing device, cause the computing device to:

determine, for one or more wireless devices served by a serving enhanced nodeB (eNB), to perform signal interference measurements, the serving eNB having a neighboring eNB and operating in a wireless communication network, wherein to determine is based on an identification by the serving eNB of the neighboring eNB on which the signal interference measurements are to be performed by the one or more wireless devices and wherein the identification is based in part on a determination whether a quality of signals transmitted by the serving eNB is affected by interference from transmissions from the neighboring eNB; and request that the neighboring eNB transmit one or more typical interference signals within one or more data units configured for a scheduled physical downlink shared channel (PDSCH) transmission, wherein the one or more data units are non-almost blank subframes (non-ABS), wherein the signal interference measurements are performed based at least in part on the one or more typical interference signals, wherein the one or more typical interference signals are generated based in part on one or more parameters of transmissions by the neighboring eNB gathered over a determined period of time, the one or more parameters including at least a power level of transmissions and beam forming patterns.

24. The at least one non-transitory computing device-readable storage medium of claim 23, wherein the wireless communication network includes a $3^{rd}$ Generation Partnership Project (3GPP) Long Term Evolution (LTE) network.

* * * * *